H. BURTON.
SUPPORT FOR ENGINES.
APPLICATION FILED NOV. 3, 1916.

1,211,077.

Patented Jan. 2, 1917.

Inventor
Herbert Burton
By A. P. Greeley
Attorney

UNITED STATES PATENT OFFICE.

HERBERT BURTON, OF NEW YORK, N. Y.

SUPPORT FOR ENGINES.

1,211,077.  Specification of Letters Patent.  Patented Jan. 2, 1917.

Application filed November 3, 1916. Serial No. 129,346.

*To all whom it may concern:*

Be it known that I, HERBERT BURTON, a citizen of the United States, residing at New York, in the county of New York, State of New York, have invented certain new and useful Improvements in Supports for Engines, of which the following is a description, reference being had to the accompanying drawings, forming a part hereof.

My invention relates to means for supporting high speed engines and other motors and has for its object to provide supporting means which will absorb the tremulous motion or vibration of the engine or other motor so that it will not affect the floor or foundation on which the weight of the engine or other motor is sustained.

In the use of high speed engines whether steam engines or explosive engines there is usually found to be considerable vibration particularly if bearings of rotary parts are not exactly true and this is also found to be the case with electric motors. Also with engines, either steam or explosive, driven at high speed more or less vibration is caused by the rapid reciprocation of the pistons. These vibrations are particularly objectionable and may even be a source of danger particularly when the engine or other motor is used on an upper floor of a high building. It is of course obvious that the effect of the vibrations of the engine may be lessened by cushions or other resilient supports between it and the floor, but if the cushions are made resilient enough to respond to the relatively light but rapid vibrations they will be compressed beyond the limit of resilience by any substantial shock or movement, and if they are made strong enough to sustain the shocks they will not respond to the vibrations.

It is the object of this invention to provide by a combination of springs and levers, a support adapted for light, rapid running engines or motors which will take up the vibrations or tremulous movement of the engine due to its running so that the vibrations will not reach the floor and at the same time be adapted to take up also the shocks or substantial movements of the engine which would not be taken up by springs or cushions adapted to take up vibrations.

With this object in view my invention consists in the construction and combination of elements hereinafter described and claimed.

Figure 1:
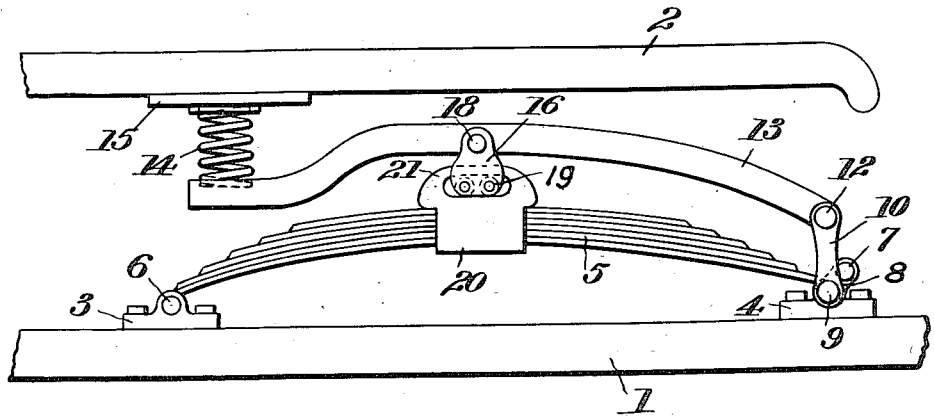
Figure 2:
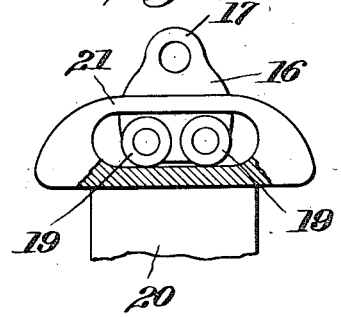

Referring to the drawings: Figure 1 is a side view of an engine or motor support embodying my invention. Fig. 2 is a detail view of the bearing for the movable arm.

In the drawings 1 indicates the floor or other foundation which sustains the weight of the engine or other motor and its supporting platform.

2 indicates the platform on which the engine or other motor is carried.

3 and 4 indicate holders secured to the floor or other foundation and adapted to hold the ends of an inverted leaf spring 5 made up of a plurality of leaves of usual construction, the ends of the longest leaf of which are bent or rolled around pins 6 and 7 of which pin 6 is carried in holder 3 and pin 7 is carried in the usual short links 8 having at their other ends pin 9 which is carried in holder 4, the arrangement shown being the same as is usually employed in connection with leaf springs for vehicles except that the spring is convex upward instead of downward.

On the ends of pin 9 are carried connector links 10, the upper ends of which are provided with openings for the ends of pin 12 which is carried by the end of movable arm 13, the other end of which supports through spring 14 a spring table 15 on which the supporting platform 2 rests.

Between its ends directly over the middle of the inverted leaf spring, the movable arm 13 is provided with a cage or frame 16 having upwardly extending ears 17 to receive pin 18 by which they are held to the movable arm and having on its lower side a pair of rollers 19. The inverted leaf spring is provided with the usual clamp 20 for holding the leaves together and to the upper side of this is secured a loop 21, the lower part of which serves as a track for the rollers 19 and the upper part of which extends over the middle part of the rollers. The coiled spring 14 and the leaf spring 5 are preferably of about the same resistance to compression.

In operation any depression of the platform 2 will compress the spring 14 and through the spring will depress the free end of movable arm 13. This will bring pressure on the rollers 19 and through them on the leaf spring 5 to compress it. The pressure on the rollers 19 will tend to prevent them from rolling freely on the bearing surface so as to retard their movement in the direction of the pin 6 and thus to increase the pressure on the leaf spring, the amount of retardation being dependent on the extent of depression of the platform 2 and the force transmitted by the spring 14. When the shock and the resilient depressing of the platform 2 is slight the rollers 19 will move easily along the surface on which they bear and will produce only slight compression of the leaf spring. When the shock and the resultant depression of the platform 2 is greater the movement of the rollers 19 will be retarded and they will thus serve as an additional resistance. This rolling contact between the movable arm and the leaf spring serves to distribute the shock and to give increased resistance to more severe shocks.

It will of course be understood that the invention is not intended to be limited to the precise construction shown and described as it is obvious that changes in the proportion and arrangement of the parts may readily be made without departing from the spirit of the invention and it will of course be understood that the invention may be used for supporting any devices subject to vibration and shock.

Having thus described my invention what I claim is:—

1. In a support for high speed engines and the like a main spring, an arm having one end pivotally connected to the spring and having a movable bearing between its ends on the main spring, a spring carried by the free end of the arm and a platform supported by the spring carried by the arm.

2. In a support for high speed engines and the like, a main spring, a link at one end of the spring, an arm pivoted to the link and extending over the main spring, a spring carried by the free end of the arm, a platform carried by the spring on the arm, and a bearing carried by the arm provided with rollers arranged to bear on the main spring midway between its ends.

3. In a support for high speed engines and the like, an inverted leaf spring, a link at one end of the spring, an arm pivoted at one end to the link, and extending over the inverted leaf spring, a spring carried by the free end of the arm, a platform carried by the spring on the free end of the arm, and a bearing carried by the arm provided with rollers arranged to bear on the inverted leaf spring midway between its ends.

In testimony whereof I affix my signature this 3rd day of November 1916.

HERBERT BURTON.